US010655519B2

(12) United States Patent
Morales Teraoka et al.

(10) Patent No.: US 10,655,519 B2
(45) Date of Patent: May 19, 2020

(54) VEHICLE

(71) Applicant: TOYOTA JIDOSHA KABUSHIKI KAISHA, Toyota-shi, Aichi-ken (JP)

(72) Inventors: Edgar Yoshio Morales Teraoka, Susono (JP); Katsuhiro Itou, Mishima (JP); Ryouhei Ohno, Susono (JP); Akira Mikami, Mishima (JP); Keishi Takada, Ashigarakami-gun (JP); Masaaki Satou, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 28 days.

(21) Appl. No.: 15/845,029

(22) Filed: Dec. 18, 2017

(65) Prior Publication Data

US 2018/0179933 A1    Jun. 28, 2018

(30) Foreign Application Priority Data

Dec. 26, 2016    (JP) .................................. 2016-251295

(51) Int. Cl.
*F02D 41/02* (2006.01)
*F01N 3/02* (2006.01)
(Continued)

(52) U.S. Cl.
CPC ............. *F01N 3/027* (2013.01); *F01N 3/021* (2013.01); *F01N 3/023* (2013.01); *F01N 3/0238* (2013.01); *F01N 9/002* (2013.01); *F01N 11/00* (2013.01); *F02D 41/029* (2013.01); *F02D 41/042* (2013.01); *F01N 2260/04* (2013.01);
(Continued)

(58) Field of Classification Search
CPC .......... F01N 11/00; F01N 3/021; F01N 3/023; F01N 3/0238; F01N 3/027; F01N 9/002; F01N 2260/04; F01N 2560/08; F01N 2560/12; F01N 2900/08; F01N 2900/10; F01N 2900/12; F01N 2900/1606; F02D 41/029; F02D 41/042; F02D 2200/0812;
(Continued)

(56) References Cited

U.S. PATENT DOCUMENTS 9,784,165 B2 * 10/2017 Dutto .................... B60W 30/08
2004/0226287 A1    11/2004 Edgar et al.
(Continued)

FOREIGN PATENT DOCUMENTS

JP    2010-270699 A    12/2010

*Primary Examiner* — Thai Ba Trieu
*Assistant Examiner* — Dapinder Singh
(74) *Attorney, Agent, or Firm* — Finnegan, Henderson, Farabow, Garrett & Dunner, LLP

(57) ABSTRACT

A vehicle includes a filter disposed in an exhaust passage through which exhaust gas discharged from an internal combustion engine passes, the filter being configured to collect PM that is particulate matter contained in the exhaust gas; a PM removal control device configured to start execution of PM removal control that heats the filter to remove the PM accumulated on the filter while the internal combustion engine is stopped; and a determination device configured to determine whether a user of the vehicle is away from the vehicle. The PM removal control device is configured to start the execution of the PM removal control only when the determination device determines that the user of the vehicle is away from the vehicle.

11 Claims, 5 Drawing Sheets

(51) Int. Cl.
*F01N 3/10* (2006.01)
*F01N 9/00* (2006.01)
*F01N 11/00* (2006.01)
*F01N 3/027* (2006.01)
*F01N 3/023* (2006.01)
*F01N 3/021* (2006.01)
*F02D 41/04* (2006.01)

(52) U.S. Cl.
CPC ...... *F01N 2560/08* (2013.01); *F01N 2560/12* (2013.01); *F01N 2900/08* (2013.01); *F01N 2900/10* (2013.01); *F01N 2900/12* (2013.01); *F01N 2900/1606* (2013.01); *F02D 2200/0812* (2013.01); *F02D 2200/101* (2013.01); *F02D 2200/501* (2013.01); *F02D 2200/60* (2013.01); *F02D 2200/701* (2013.01); *Y02T 10/47* (2013.01)

(58) Field of Classification Search
CPC ......... F02D 2200/101; F02D 2200/501; F02D 2200/60; F02D 2200/701; Y02T 10/47
USPC .......................... 60/274, 286, 295, 297, 311
See application file for complete search history.

(56) References Cited

U.S. PATENT DOCUMENTS

| | | | |
|---|---|---|---|
| 2010/0326403 A1* | 12/2010 | Gonze | F01N 3/027 123/436 |
| 2011/0277449 A1* | 11/2011 | Gonze | F01N 3/2026 60/274 |
| 2012/0023910 A1 | 2/2012 | Parrish et al. | |
| 2012/0031079 A1* | 2/2012 | Spicer | F02G 1/043 60/278 |
| 2012/0227378 A1 | 9/2012 | Koestler | |
| 2013/0291515 A1 | 11/2013 | Gonze et al. | |

* cited by examiner

VEHICLE

INCORPORATION BY REFERENCE

The disclosure of Japanese Patent Application No. 2016-251295 filed on Dec. 26, 2016 including the specification, drawings and abstract is incorporated herein by reference in its entirety.

BACKGROUND

1. Technical Field

The disclosure relates to a vehicle including a filter that collects particulate matter contained in exhaust gas discharged from an internal combustion engine.

2. Description of Related Art

There has been a technique (also referred to as "PM removal control" below) for a control device for an internal combustion engine including a filter disposed in an exhaust passage so as to collect particulate matter (also referred to as PM below) (see, for example, US 2004/0226287 A). In the PM removal control, a device for PM removal control is operated, and the filter is automatically heated, regardless of the intention of a user, such that the PM is oxidized and thus removed, when the amount of the PM accumulated on the filter is equal to or above a specified amount and the internal combustion engine is stopped.

SUMMARY

When the PM removal control is applied to a vehicle, the PM removal control may be executed after driving of the vehicle is finished. In this case, the PM removal control is started regardless of the intention of a user of the vehicle, and a device for PM removal control is operated although driving of the vehicle is finished. Therefore, if the user, including a driver of the vehicle, who has been in the vehicle during driving of the vehicle, stays in the vehicle or in the vicinity of the vehicle, the user may feel discomfort due to operation sound and the like caused by operation of the device for PM removal control.

The disclosure provides a vehicle that makes it possible to reduce the possibility that a user feels discomfort due to a device for PM removal control that is operated regardless of the intention of the user, the vehicle including a filter disposed in an exhaust passage and the vehicle being configured such that the PM removal control is executed during stop of the vehicle.

A vehicle according to an aspect of the disclosure includes a filter disposed in an exhaust passage through which exhaust gas discharged from an internal combustion engine passes, the filter being configured to collect PM that is particulate matter contained in the exhaust gas; a PM removal control device configured to start execution of PM removal control that heats the filter to remove the PM accumulated on the filter while the internal combustion engine is stopped; and a determination device configured to determine whether a user of the vehicle is away from the vehicle. The PM removal control device is configured to start the execution of the PM removal control only when the determination device determines that the user of the vehicle is away from the vehicle.

The user may feel discomfort when noticing that operation of a device for PM removal control is started during the stop of the internal combustion engine. Accordingly, execution of the PM removal control may be started when the user does not notice that the device for PM removal control is operated. By starting execution of the PM removal control when it is determined that the user is away from the vehicle, the user becomes less likely to notice that the device for PM removal control is operated. This makes it possible to reduce the possibility that the user feels discomfort due to operation sound and the like relating to operation of the device.

In the vehicle according to the above aspect, the determination device may be configured to determine that the user of the vehicle is away from the vehicle when a seat pressure that is a pressure applied to a seat of the vehicle is smaller than a specified seat pressure and a door of the vehicle is locked.

In the vehicle according to the above aspect, the determination device may be configured to determine that the user of the vehicle is away from the vehicle when a seat pressure that is a pressure applied to a seat of the vehicle is smaller than a specified seat pressure, and a state where there is no moving object in vicinity of the vehicle continues for a first time period.

When the seat pressure is equal to or above the specified pressure, it can be determined that the user is in the vehicle. Accordingly, when the seat pressure is smaller than the specified pressure, it can be determined that the user does not sit on the seat of the vehicle, i.e., the user is not in the vehicle, and the user is in the vicinity of the vehicle or is away from the vehicle. When the door of the vehicle is locked, it can be determined that there is a high possibility that the user is not in the vicinity of the vehicle, and the user is in the vehicle or is away from the vehicle. Therefore, it can be determined that the user is away from the vehicle when a condition "the seat pressure that is the pressure applied to the seat of the vehicle is smaller than the specified seat pressure" and a condition "the door of the vehicle is locked" are both satisfied. Accordingly, execution of the PM removal control may be started when the condition "the seat pressure that is the pressure applied to the seat of the vehicle is smaller than the specified seat pressure" and the condition "the door of the vehicle is locked" are both satisfied. This makes it possible to reduce the possibility that the user notices that the device for PM removal control is operated, and to reduce the possibility that the user feels discomfort.

Similarly, when the seat pressure is equal to or above the specified pressure, it can be determined that the user is in the vehicle. That is, when the seat pressure is smaller than the specified pressure, it can be determined that the user is not in the vehicle, and the user is in the vicinity of the vehicle or is away from the vehicle. When there is no moving object in the vicinity of the vehicle, it can be determined that there is a high possibility that the user is not in the vicinity of the vehicle, and the user is in the vehicle or is away from the vehicle. Therefore, it can be determined that the user is away from the vehicle when the condition "the seat pressure that is the pressure applied to the seat of the vehicle is smaller than the specified seat pressure" and the condition "the state where there is no moving object in the vicinity of the vehicle continues for the first time period" are both satisfied. Accordingly, execution of the PM removal control may be started when the condition "the seat pressure that is the pressure applied to the seat of the vehicle is smaller than the specified seat pressure" and the condition "the state where there is no moving object in the vicinity of the vehicle continues for the first time period" are both satisfied. This makes it possible to reduce the possibility that the user notices that the device for PM removal control is operated and to reduce the possibility that the user feels discomfort. The term "first time period" represents a time period long enough to determine that the user is not in the vicinity of the vehicle. For example, the first time period may be one minute.

The vehicle according to the above aspect may further include a distance acquisition device configured to acquire a distance between the vehicle and the user; and the determination device may be configured to determine that the user of the vehicle is away from the vehicle when the distance acquisition device detects that the user of the vehicle is away from the vehicle by at least a specified distance.

The vehicle according to the above aspect may further include a smart key reception device configured to receive a signal from a smart key that communicates with the vehicle; and the determination device may be configured to determine that the user of the vehicle is away from the vehicle when a state where the smart key reception device receives no signal from the Smart key continues for a second time period.

When the distance between the vehicle and the user is acquired, and the user is away from the vehicle by at least the specified distance, it can be determined that the user is not in the vehicle or in the vicinity of the vehicle, and the user is away from the vehicle. Accordingly, when "the distance acquisition device detects that the user of the vehicle is away from the vehicle by at least the specified distance", execution of the PM removal control may be started. This makes it possible to reduce the possibility that the user notices that the device for PM removal control is operated and to reduce the possibility that the user feels discomfort. Here, "specified distance" is a distance long enough to prevent the user from noticing that an actuator is operated for the PM removal control.

Similarly, when the state where no signal is received from the smart key continues, it can be determined that the user is not in the vehicle or in the vicinity of the vehicle, and the user is away from the vehicle. Accordingly, when "the state where the smart key reception device receives no signal from the smart key continues for the second time period", the PM removal control may be started. This makes it possible to reduce the possibility that the user notices that the device for PM removal control is operated and to reduce the possibility that the user feels discomfort.

The vehicle according to the above aspect may further include a PM accumulation amount acquisition device configured to acquire an accumulation amount of the PM accumulated on the filter; and the PM removal control device may be configured to start execution of the PM removal control when the determination device determines that the user of the vehicle is away from the vehicle, and the accumulation amount of the PM acquired by the PM accumulation amount acquisition device is larger than a first accumulation amount.

When the accumulation amount of the PM accumulated on the filter is small, the amount of PM that can be removed by execution of the PM removal control is small. This may exert an adverse effect on efficiency of the PM removal control. Accordingly, when the determination device determines that the user of the vehicle is away from the vehicle, and the accumulation amount of the PM accumulated on the filter (the accumulation amount of the PM acquired by the PM accumulation amount acquisition device) is larger than the first accumulation amount, the PM removal control may be executed. This makes it possible to efficiently remove the PM.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
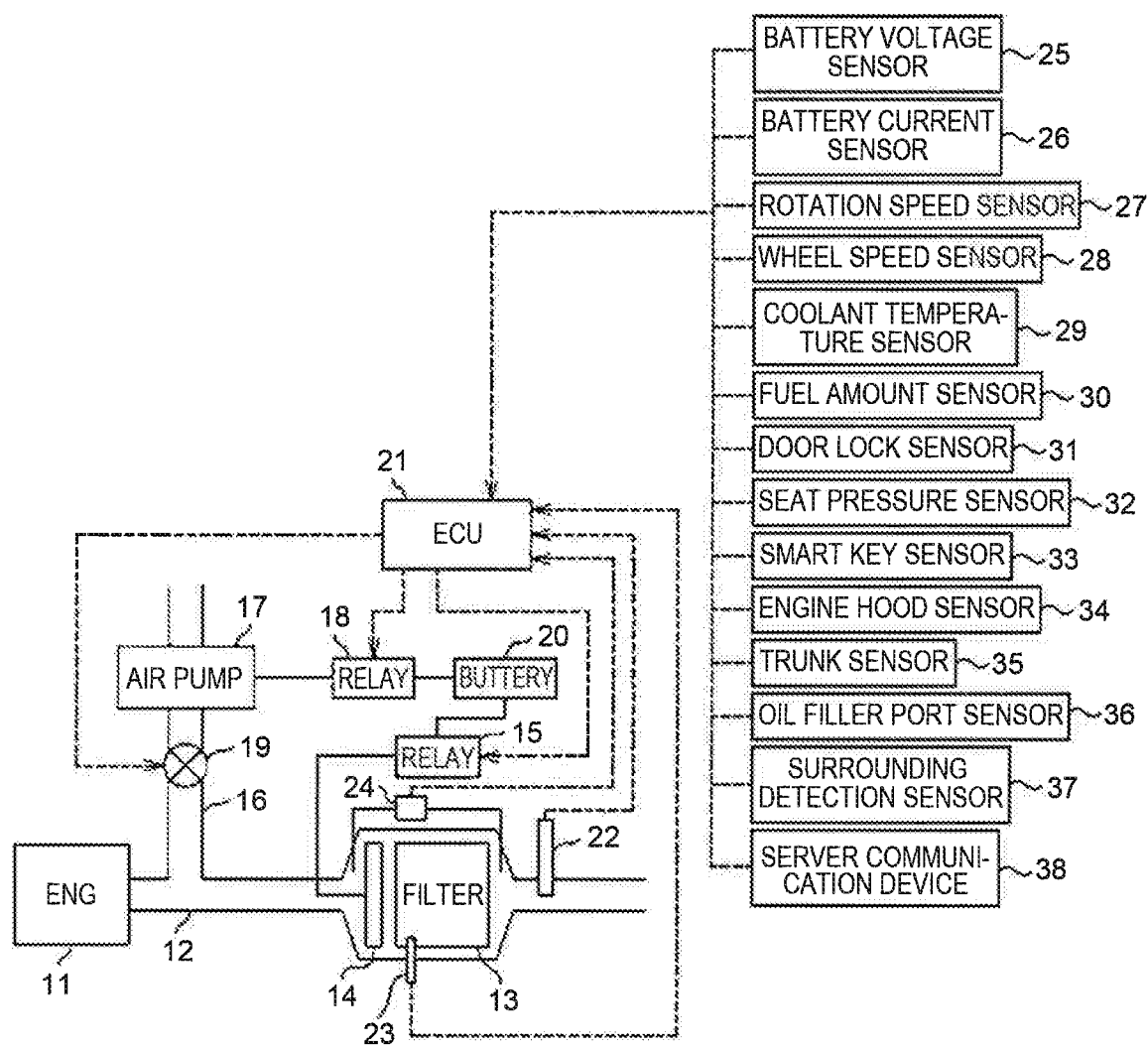
FIG. 1 is a schematic view of a vehicle according to a first embodiment of the disclosure and an exhaust gas system for an internal combustion engine that is applied to the vehicle.

As illustrated in FIG. 1, a vehicle 1 (also referred to as "first vehicle" below) according to a first embodiment of the disclosure includes an internal combustion engine 11. The internal combustion engine 11 is mounted on the vehicle 1 as a driving source. The internal combustion engine 11 is a compression ignition diesel engine. The internal combustion engine 11 is not limited to the compression ignition diesel engine as long as PM removal control is executed in the internal combustion engine 11. The internal combustion engine 11 is connected to an exhaust passage 12 through which the exhaust gas discharged from the internal combustion engine 11 is released to the air.

The vehicle 1 (the first vehicle) includes a filter 13 that collects PM contained in the exhaust gas discharged from the internal combustion engine 11. The filter 13 is provided in the exhaust passage 12. A heater 14 is provided to face an upstream end portion of the filter 13. The exhaust passage 12 is branched into a secondary air supply pipe 16 at a position upstream of the heater 14. In an intermediate portion of the secondary air supply pipe 16, an electromagnetic valve 19 is disposed. The electromagnetic valve 19 is configured to prevent backflow of the exhaust gas to a secondary air supply channel during normal operation. The secondary air supply pipe 16 is provided with an air pump 17. When the electromagnetic valve 19 is placed in an opened state, and the air pump 17 is driven during stop of the internal combustion engine 11, secondary air is supplied to the exhaust passage 12. Furthermore, when the heater 14 is energized with an electric current supplied from a battery which is not illustrated, the heater 14 generates heat, which removes the PM collected in the filter 13.

The first vehicle further includes an electronic control unit (ECU) 21 and sensors (22 to 38) described below. The ECU 21, which is connected with the sensors, receives signals from the sensors. The ECU 21 is connected with the heater 14 through a semiconductor relay 15. In accordance with a control signal from the ECU 21, energization of the heater 14 is controlled. The ECU 21 is also connected with the air pump 17 through a semiconductor relay 18. In accordance with a control signal from the ECU 21, the driving amount of the air pump 17 is controlled. The ECU 21 sends out an instruction signal to an unillustrated fuel injection valve of the internal combustion engine 11 to change the amount of fuel supplied to a combustion chamber of the internal combustion engine 11. The ECU 21 sends out an instruction signal to an unillustrated throttle valve to change the amount of intake air supplied to the internal combustion engine 11. The ECU 21 is an electronic control circuit including a microcomputer as a main component part, the microcomputer including a CPU, a ROM, a RAM, and an interface. The CPU implements later-described various functions by executing routines stored in the ROM.

Hereinafter, the sensors and devices from which the ECU 21 receives signals will be described. An exhaust passage temperature sensor 22 detects the temperature of the exhaust passage 12 and outputs a signal representative of an exhaust passage temperature Tex. A filter temperature sensor 23 detects the temperature of the filter 13, and outputs a signal representative of a filter temperature Tf. A differential pressure sensor 24 detects a pressure difference between a position upstream of the filter 13 and a position downstream of the filter 13, and outputs a signal representative of a pressure difference dP. The differential pressure sensor 24 may be regarded as a PM accumulation amount acquisition device according to the disclosure. A battery voltage sensor 25 detects a voltage value V of a battery of the vehicle 1 including the internal combustion engine 11, and outputs a signal representative of the voltage value V of the battery. A battery current sensor 26 detects a current value I of the battery of the vehicle 1 including the internal combustion engine 11, and outputs a signal representative of the current value I of the battery. A rotation speed sensor 27 detects a rotation speed NE of a crankshaft which is not illustrated, and outputs a signal representative of the rotation speed NE of the crankshaft. A wheel speed sensor 28 detects a wheel speed of the vehicle 1, and outputs a signal representative of a speed (vehicle speed SPD) of the vehicle 1 based on the wheel speed. A coolant temperature sensor 29 detects the temperature (coolant temperature THW) of the coolant that cools the internal combustion engine 11, and outputs a signal representative of the coolant temperature THW. A fuel amount sensor 30 detects a fuel amount FL of the fuel stored in an unillustrated fuel tank of the vehicle 1, and outputs a signal representative of the fuel amount FL. A door lock sensor 31 detects whether a door of the vehicle 1 is locked, and outputs a signal representative of whether the door of the vehicle 1 is locked. A seat pressure sensor 32 detects the pressure (seat pressure SP) applied to a driver seat of the vehicle 1, and outputs a signal representative of the seat pressure SP. A seat pressure sensor 32 may be disposed on a passenger seat or a backseat, as well as on the driver seat. Accordingly, not only the driver but also passengers of the vehicle 1 can be the user of the first vehicle. A smart key sensor 33 detects whether a signal is transmitted from a Smart key, and outputs a signal representative of whether the signal of the smart key is transmitted. The smart key sensor 33 may be regarded as a smart key reception device according to the disclosure. An engine hood sensor 34 detects whether the engine hood of the first vehicle 1 is closed, and outputs a signal representative of whether the engine hood of the first vehicle 1 is closed. A trunk sensor 35 detects whether the trunk (in other words, the boot) of the vehicle 1 is closed, and outputs a signal representative of whether the trunk of the vehicle 1 is closed. An oil filler port sensor 36 detects whether the oil filler port of the vehicle 1 is closed, and outputs a signal representative of whether the oil filler port of the vehicle 1 is closed. A surrounding detection sensor 37 detects, whether the user is in the vicinity of the vehicle 1, and outputs a signal representative of whether the user is in the vicinity of the vehicle 1. A radar or a camera disposed at the vehicle 1 may be regarded as the surrounding detection sensor 37. A server communication device 38 communicates with a server disposed at a location different from the vehicle 1 to receive from the server a signal representative of whether the user is approaching the vehicle 1, and outputs the received signal. The server communication device 38 may be regarded as a distance acquisition device according to the disclosure.

A description is now provided on the operation of the vehicle 1. The vehicle 1 repeatedly executes processing of a first control routine illustrated in FIG. 2, each time a prescribed time elapses. Therefore, at a prescribed timing, the CPU proceeds to processing of S101 to determine whether the speed SPD is zero, i.e., whether the vehicle 1 including the internal combustion engine 11 is in a stopped state. When the vehicle speed SPD is not zero, i.e., when the first vehicle 1 including the internal combustion engine 11 is moving, the CPU determines "NO" in S101, and ends the present routine. When the vehicle speed SPD is zero, i.e., when the first vehicle 1 including the internal combustion engine 11 is in the stopped state, the CPU determines "YES" in S101, and proceeds to processing of S102.

In S102, the CPU determines whether the rotation speed NE of the internal combustion engine 11 is zero, i.e., whether the internal combustion engine 11 is in the stopped state. When the rotation speed of the internal combustion engine 11 is not zero, i.e., when the internal combustion engine 11 is not in the stopped state, the CPU determines "NO" in S102, and ends the present routine. When the rotation speed of the internal combustion engine 11 is zero, i.e., when the internal combustion engine 11 is in the stopped state, the CPU determines "YES" in S102, and proceeds to processing of S103.

In S103, the CPU determines whether a PM removal control condition satisfaction flag Xa is "1." The PM removal control condition satisfaction flag Xa is a flag indicating whether the execution of the PM removal control is to be started during the stop of the internal combustion engine 11 based on whether the user is away from the vehicle 1. The PM removal control condition satisfaction flag Xa will be described later with reference to FIG. 4. When the PM removal control condition satisfaction flag Xa is "0", it can be determined that the user is in the vehicle 1, or in the vicinity of the vehicle 1. Accordingly, the CPU determines "NO" in S103, and ends the present routine. When the PM removal control condition satisfaction flag Xa is "1", it can be determined that the user is away from the vehicle 1. Accordingly, the CPU determines "YES" in S103, and proceeds to processing of S104. The PM removal control condition satisfaction flag Xa is set to "0" at the startup of the internal combustion engine 11.

In S104, the CPU determines whether the amount of PM accumulated on the filter 13 is larger than a first accumulation amount M. Here, the accumulation amount of PM accumulated on the filter 13 is calculated based on the pressure difference dP between the pressure of the exhaust passage at the position upstream of the filter 13 and the pressure of the exhaust passage at the position downstream of the filter 13, the pressure difference dP being acquired by the differential pressure sensor 24. When the pressure difference acquired by the differential pressure sensor 24 is large, it is determined that the accumulation amount of PM accumulated on the filter 13 is large, as compared to when the pressure difference is small. In other words, it is determined that the accumulation amount of PM at the time when the pressure difference acquired by the differential pressure sensor 24 is large is larger than the accumulation amount of PM at the time when the pressure difference acquired by the differential pressure sensor 24 is small. When the accumulation amount of PM accumulated on the filter 13 is equal to or below the first accumulation amount M, the CPU determines "NO" in S104, and ends the present routine. When the amount of PM accumulated on the filter 13 is larger than the first accumulation amount M, the CPU determines "YES" in S104, and proceeds to processing of S105.

In S105, the CPU transmits a signal to the heater 14 and the air pump 17 so as to execute the PM removal control. Here, the PM removal control is executed such that electric current is supplied from the battery to the heater 14 to heat the heater 14, while electric power is supplied from the battery to the air pump 17 to supply air to the exhaust passage 12. Then, the CPU proceeds to processing of S106 to set a PM removal control execution flag Xs to "1", and ends the present routine. The PM removal control execution flag Xs is set to "0" at the start-up of the internal combustion engine 11. The ECU 21 (CPU) that executes processing of S105 may be regarded as a PM removal control device according to the disclosure.

Figure 2:
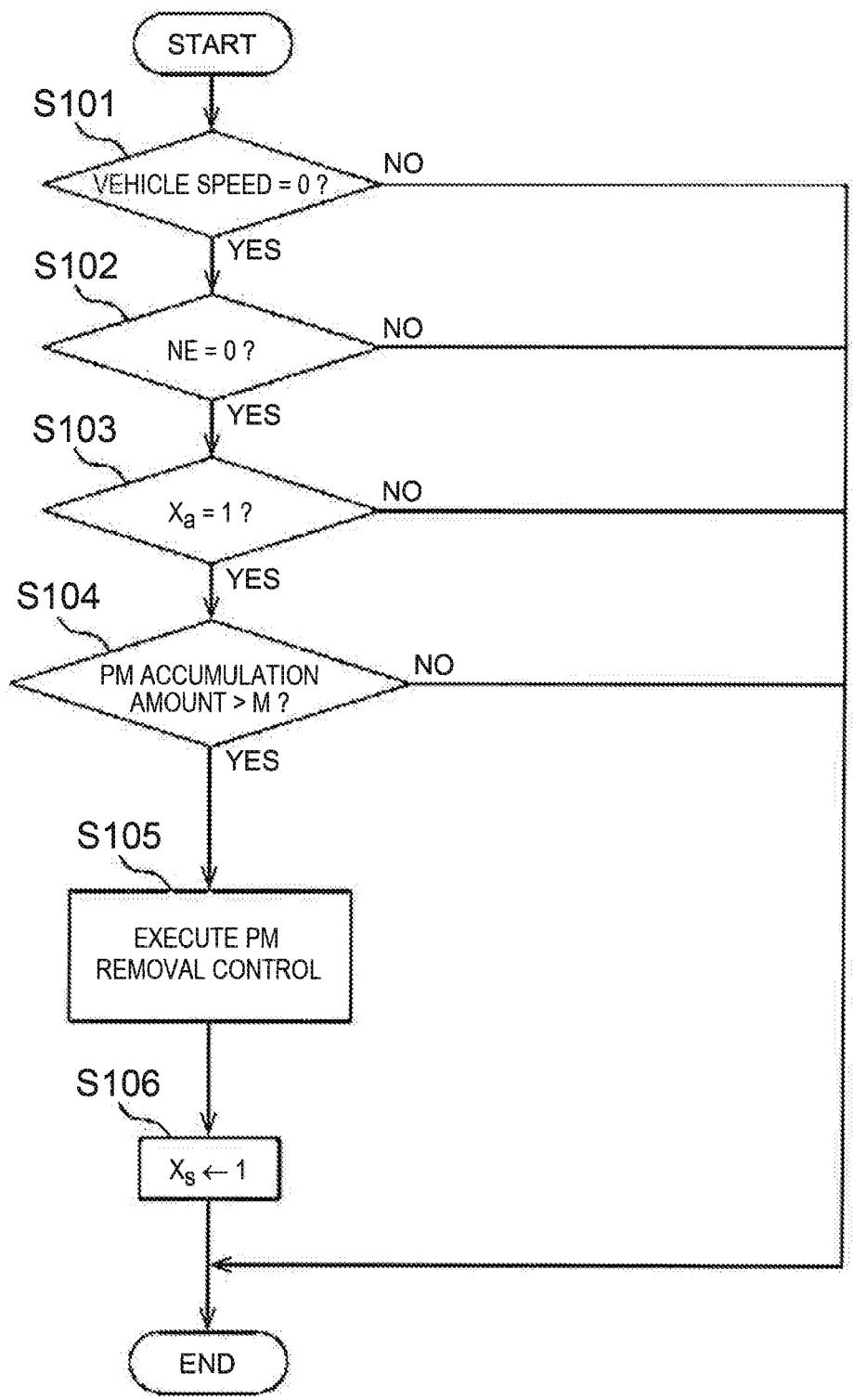
FIG. 2 is a flowchart illustrating a routine executed by an ECU illustrated in FIG. 1.
Figure 3:
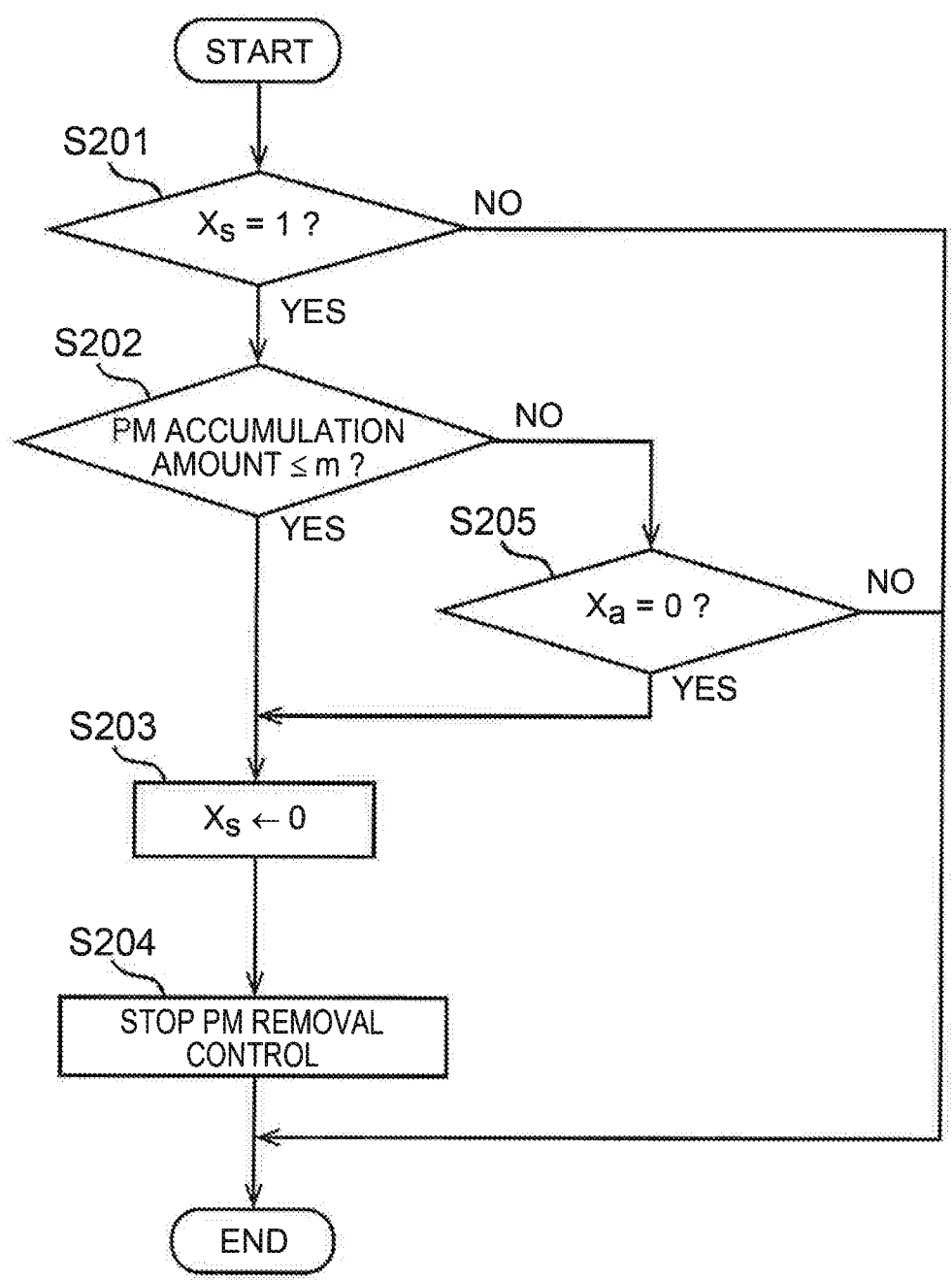
FIG. 3 is a flowchart illustrating a routine executed by the ECU illustrated in FIG. 1.

Furthermore, in parallel with the first control routine illustrated in FIG. 2, the CPU repeatedly executes a second control routine illustrated in FIG. 3, each time a prescribed time elapses. Therefore, at a prescribed timing, the CPU proceeds to processing of S201 to determine whether the PM removal control execution flag Xs is "1" When the PM removal control execution flag Xs is "0", the CPU determines "NO" in S201, and ends the present routine. When the PM removal control execution flag Xs is "1", the CPU determines "YES" in S201, and proceeds to processing of S202.

In S202, the CPU determines whether the amount of PM accumulated on the filter 13 is equal to or below a second accumulation amount m. When the amount of PM accumulated on the filter 13 is larger than the second accumulation amount m, the CPU determines "NO" in S202, and proceeds to processing of S205. In S205, the CPU determines whether the PM removal control condition satisfaction flag Xa is "0." When the PM removal control condition satisfaction flag Xa is "1", it can be determined that the user is not in the vehicle 1 or in the vicinity of the vehicle 1, and is away from the vehicle during execution of the PM removal control. Accordingly, the CPU determines "NO" in S205, ends the present routine, and continues the PM removal control. When the PM removal control condition satisfaction flag Xa is "0", it can be determined that the user is in the vehicle 1 or in the vicinity of the vehicle 1 during execution of the PM removal control. Accordingly, the CPU determines "YES" in S205, and proceeds to processing of S203.

In S203, the CPU sets the PM removal control execution flag Xs to "0", and proceeds to processing of S204. In S204, the CPU stops the PM removal control and ends the present routine. Here, the phrase "stopping the PM removal control" signifies stopping supply of electric current from the battery to the heater 14 to stop heating of the heater 14.

When the amount of PM accumulated on the filter 13 is equal to or below the second accumulation amount m, the CPU determines "YES" in S202, and proceeds to processing of S203 to execute the operation described above.

Figure 4:
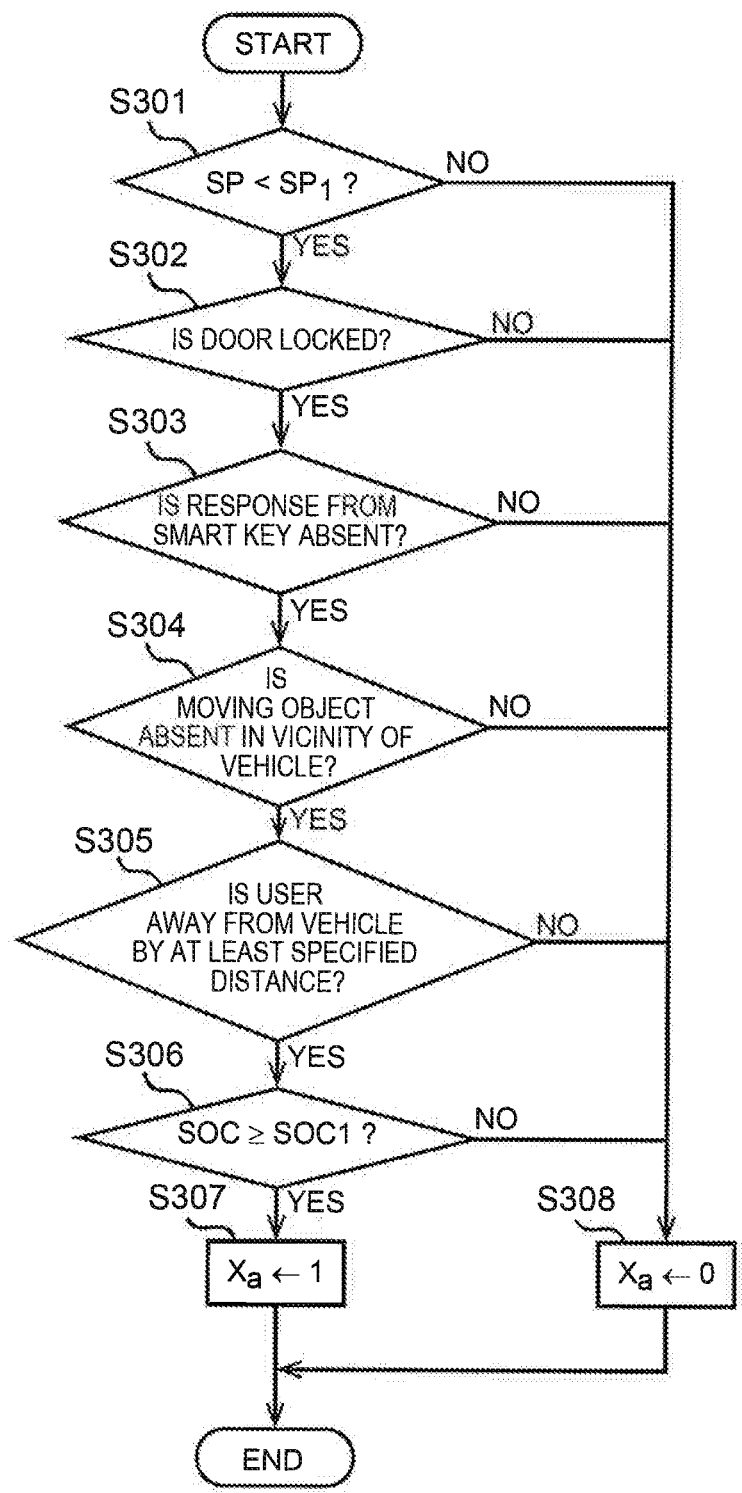
FIG. 4 is a flowchart illustrating a routine executed by the ECU illustrated in FIG. 1.

Furthermore, in parallel with the second control routine illustrated in FIG. 3, the CPU repeatedly executes a third control routine illustrated in FIG. 4, each time a prescribed time elapses. Therefore, at a prescribed timing, the CPU proceeds to processing of S301 to determine whether the seat pressure SP output from the seat pressure sensor 32 is smaller than a first seat pressure $SP_1$. Here, the first seat pressure $SP_1$ is a value which is smaller than a seat pressure corresponding to the pressure at the time when the user is on the seat and is larger than a seat pressure corresponding to the pressure at the time when an object other than the user is on the seat. For example, the first seat pressure $SP_1$ is 10 kg. When the seat pressure SP is equal to or above the first seat pressure $SP_1$, i.e., when it is determined that the user is on the seat, it is assumed that there is a possibility that the user is in the vehicle and the user starts up the internal combustion engine 11. Accordingly, the CPU determines "NO" in S301, proceeds to processing of S308 to set the PM removal control condition satisfaction flag Xa to "0", and ends the present routine. When the seat pressure SP is smaller than the first seat pressure $SP_1$, i.e., when it is determined that the user is not on the seat, it is determined that the user is not in the vehicle. Accordingly, the CPU determines "YES" in S301, and proceeds to processing of S302.

In S302, the CPU determines whether the door of the vehicle 1 is locked. Whether the door of the vehicle 1 is locked is detected by the door lock sensor 31. When the door of the vehicle 1 is not locked, it is considered that there is a high possibility that the user is in the vicinity of the vehicle 1 and is not away from the vehicle 1. Accordingly, the CPU determines "NO" in S302, proceeds to processing of S308 to set the PM removal control condition satisfaction flag Xa to "0", and ends the present routine. When the door of the vehicle 1 is locked, it can be determined that there is a high possibility that the user is not in the vicinity of the vehicle 1 and is away from the vehicle 1. Accordingly, the CPU determines "YES" in S302, and proceeds to processing of S303.

In S303, the CPU determines whether a response from the smart key is absent. More specifically, the CPU determines whether a state where a response from the smart key is absent (in other words, a state where there is no response from the smart key) continues for a specified time period. Whether a response from the smart key is absent is detected by the smart key sensor 33. When there is a response from the smart key, it can be determined that the user is in the vicinity of the vehicle 1. Accordingly, the CPU determines "NO" in S303, proceeds to processing of S308 to set the PM removal control condition satisfaction flag Xa to "0", and ends the present routine. When a response from the smart key is absent (in other words, when there is no response from the smart key), it can be determined that the user is away from the vehicle 1. Accordingly, the CPU determines "YES" in S303, and proceeds to processing of S304.

In S304, the CPU determines whether a moving object is absent in the vicinity of the vehicle 1. More specifically, the CPU determines whether a state where a moving object is absent in the vicinity of the vehicle 1 (in other words, a state where there is no moving object in the vicinity of the vehicle 1) continues for a specified time period. Whether a moving object is absent in the vicinity of the vehicle 1 is detected by the surrounding detection sensor 37. When there is a moving object in the vicinity of the vehicle 1, it is considered that there is a high possibility that the user is in the vicinity of the vehicle 1. Accordingly, the CPU determines "NO" in S304, proceeds to processing of S308 to set the PM removal control condition satisfaction flag Xa to "0", and ends the present routine. When a moving object is absent in the vicinity of the vehicle 1 (in other words, when there is no moving object in the vicinity of the vehicle 1), it is considered that there is a high possibility that the user is not in the vicinity of the vehicle 1. Accordingly, the CPU determines "YES" in S304, and proceeds to processing of S305.

In S305, the CPU determines whether a signal indicating that the user is away from the vehicle by at least a specified distance is received from the server. For the determination, the CPU first acquires the position of the user from a terminal such as a smartphone possessed by the user, the terminal being configured to transmit a GPS signal. The CPU then transmits a signal including the acquired information to the server disposed separately from the vehicle 1. The CPU also acquires the position of the vehicle 1 using an unillustrated on-board GPS device provided in the vehicle 1, and transmits a signal including the acquired information to the server. The server performs calculation using these transmitted signals, and transmits, to the server communication device 38 of the vehicle 1, a signal including the information regarding whether the distance between the user and the vehicle 1 is less than a specified distance. When it is determined that the distance between the user and the vehicle 1 is less than the specified distance, there is a possibility that the user notices that the PM removal control is in execution though the internal combustion engine 11 is stopped. Accordingly, when the signal indicating that the distance between the user and the vehicle 1 is less than the specified distance is received from the server, the CPU determines "NO" in S305, proceeds to processing of S308 to set the PM removal control condition satisfaction flag Xa to "0", and ends the present routine. When a signal indicating that the user is away from the vehicle 1 by at least the specified distance is received from the server, it can be considered that there is a high possibility that the user does not notice that the PM removal control is in execution in the vehicle 1. Accordingly; the CPU determines "YES" in S305, and proceeds to processing of S306. The term "specified distance" herein refers to a distance long enough to prevent the user from noticing that the actuator is operated for the PM removal control regardless of environmental sound in the vicinity of the vehicle 1. For example, the specified distance is 15 m. Since the operation sound and the like caused by operation of the actuator vary depending on the actuator for PM removal control, the specified distance may also be changed depending on the actuator to be operated. The ECU 21 (CPU) that executes processing of S301 to S305 may be regarded as a determination device according to the disclosure.

In S306, the CPU determines whether a state of charge SOC of the battery is equal to or above a specified SOC1. Here, the state of charge SOC of the battery is a value calculated by the CPU based on the voltage value V detected by the battery voltage sensor 25 and the current value I detected by the battery current sensor 26. The state of charge SOC represents a ratio of a present charge amount to a full-charge amount. The specified state of charge SOC1 is a state of charge that makes it possible to supply electric power necessary for executing the PM removal control until the amount of PM accumulated on the filter 13 becomes equal to or below the second accumulation amount PM In the first vehicle, the specified state of charge SOC1 is a state of charge necessary for supplying electric power to the heater 14 and the air pump 17. When the state of charge SOC of the battery is smaller than the specified state of charge SOC1, the CPU determines "NO" in S306, proceeds to processing of S308 to set the PM removal control condition satisfaction flag Xa to "0", and ends the present routine. When the state of charge SOC of the battery is equal to or above the specified state of charge SOC1, the CPU determines "YES" in S306, proceeds to processing of S307 to set the PM removal control condition satisfaction flag Xa to "1", and ends the present routine.

As described in the foregoing, in the first vehicle, execution of the PM removal control is started when it is determined that the user is away from the vehicle. In that case, electric current is supplied from the battery to the heater 14 to energize the heater 14, and thus, the heater is heated. Furthermore, electric power is supplied from the battery to the air pump 17 to supply air containing oxygen to the exhaust passage 12. Accordingly, the air heated with the heater 14 can be supplied to the filter 13, which makes it possible to oxidize and thus to remove the PM accumulated on the filter 13. As a result, the user becomes less likely to notice that the device for PM removal control is operated since the user is away from the vehicle. This makes it possible to reduce the possibility that the user feels discomfort due to the operation sound and the like relating to the operation of the device.

A description is now provided on a vehicle (also referred to as "eleventh vehicle" below) according to a modification of the first embodiment of the disclosure.

Specific control executed by the ECU 21 in S105 in the routine of FIG. 2 in the eleventh vehicle is different from the specific control executed by the ECU 21 in S105 in the first vehicle. The point of difference will be mainly described below.

In S105, PM removal control is executed in the vehicle 1. Here, as the PM removal control, an unillustrated crankshaft of the internal combustion engine 11 is rotated using an unillustrated motor so as to supply air to the exhaust passage 12. The motor may be a starter motor or a motor other than the starter motor as long as the motor can transmit the driving force for rotating the crankshaft, to the crankshaft.

As described in the foregoing, in the eleventh vehicle, air is supplied to the exhaust passage 12 by rotating the internal combustion engine 11 instead of using the air pump 17 in the first vehicle. Accordingly, the air heated with the heater 14 can be supplied to the filter 13, which makes it possible to oxidize and thus to remove the PM accumulated on the filter 13. Thus, since execution of the PM removal control is started when it is determine that the user is away from the vehicle, the user is less likely to notice that the device for PM removal control is operated. This makes it possible to reduce the possibility that the user feels discomfort due to operation sound and the like relating to operation of the device.

Figure 5:
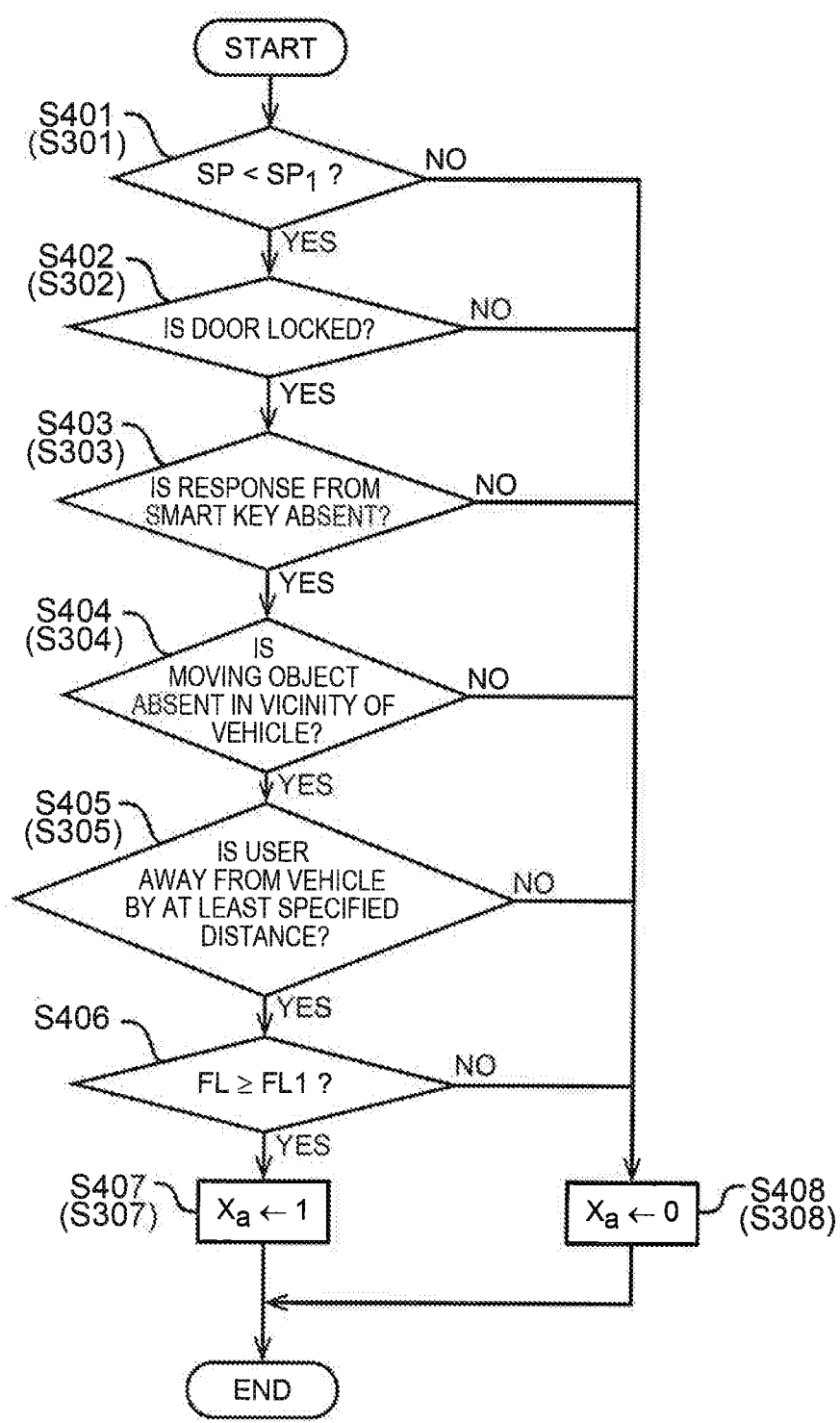
FIG. 5 is a flowchart illustrating a routine executed by an ECU in a second embodiment of the disclosure.

A description is now provided on a vehicle 1 (also referred to as "second vehicle" below) according to a second embodiment of the disclosure. The schematic configuration of the second vehicle is the same as the schematic configuration of the first vehicle according to the first embodiment of the disclosure illustrated in FIG. 1. The second vehicle includes an internal combustion engine 11 that burns fuel at an air-fuel ratio larger than the stoichiometric air-fuel ratio and discharges exhaust gas that contains a large amount of oxygen. Specific control executed by an ECU 21 in S105 in the routine of FIG. 2 in the second vehicle is different from the specific control executed by the ECU 21 in S105 in the first vehicle. The second vehicle is further different from the first vehicle in the point that a routine illustrated in FIG. 5 is executed in place of the routine illustrated in FIG. 4 in the first vehicle. The points of difference will mainly be described below.

In S105 of FIG. 2, PM removal control is executed in the vehicle 1 (the second vehicle). Here, as the PM removal control, the internal combustion engine 11 is started up to supply exhaust gas discharged from the internal combustion engine 11, to the exhaust passage 12. That is, while the internal combustion engine 11 is stopped (during the stop of the internal combustion engine 11), the execution of the PM removal control that starts up the internal combustion engine 11 is started. The CPU then proceeds to processing of S106 to set the PM removal control execution flag Xs to "1", and ends the present routine. The PM removal control execution flag Xs is set to "0" at the start-up of the ECU 21.

Steps S401 through S408 except S406 in the routine illustrated in FIG. 5 perform processing identical to the processing of S301 through S308 except S306 in the routine illustrated in FIG. 4. Among the steps illustrated in FIG. 5, the steps that perform the processing identical to the processing of the steps illustrated in FIG. 4 are provided with reference signs that are the same as those in FIG. 4 in parentheses. Accordingly, for example, S401 (S301) in FIG. 5 indicates that S401 is the step that performs the processing identical to the processing of S301. Hereinafter, a description is provided mainly on the processing of "S406" that is specific to the routine illustrated in FIG. 5. The ECU 21 (CPU) that executes processing of S401 to S405 may be regarded as a determination device according to the disclosure.

In S406 of FIG. 5, in the vehicle 1 (the second vehicle), the CPU determines whether a fuel amount FL of the fuel stored in an unillustrated fuel tank of the vehicle 1 is equal to or above a specified fuel amount FL1. Here, the fuel amount FL of the fuel stored in the fuel tank is detected by the fuel amount sensor 30. The specified fuel amount FL1 is a fuel amount that makes it possible to drive the internal combustion engine 11 so that the PM removal control can be executed. When the fuel amount FL of the fuel stored in the fuel tank is smaller than the specified fuel amount FL1, the CPU determines "NO" in S406, proceeds to processing of S408 to set the PM removal control condition satisfaction flag Xa to "0", and ends the present routine. When the fuel amount FL of the fuel stored in the fuel tank is equal to or above the specified fuel amount FL1, the CPU determines "YES" in S406, proceeds to processing of S407 to set the PM removal control condition satisfaction flag Xa to "1", and ends the present routine.

As described in the foregoing, in the second vehicle, execution of the PM removal control is started when it is determined that the user is away from the vehicle. At that time, high-temperature exhaust gas can be supplied to the filter by starting up the internal combustion engine 11. Furthermore, the internal combustion engine that is used burns fuel at an air-fuel ratio larger than the stoichiometric air-fuel ratio and discharges exhaust gas containing a lot of oxygen. Therefore, the high-temperature exhaust gas containing oxygen can be supplied to the filter 13, and thus, the PM accumulated on the filter 13 can be oxidized and thus removed. Thus, the user becomes less likely to notice operation of the device for PM removal control since the user is away from the vehicle. This makes it possible to reduce the possibility that the user feels discomfort due to the operation sound and the like relating to the operation of the device. The second vehicle may not include the secondary air supply pipe 16, the air pump 17, the semiconductor relay 18, and the electromagnetic valve 19 in the first vehicle.

In the first vehicle, the eleventh vehicle, and the second vehicle, the temperature of the filter 13 is raised by heating the filter 13 with the heater 14 as a heating device. However, the heating device is not limited to the heater 14 as long as the temperature of the filter 13 is raised. For example, in place of the heater 14, a fuel addition valve and a fuel ignition device may be provided in a portion of the exhaust passage upstream of the filter 13. A fuel may be added from the fuel addition valve, and be ignited by the fuel ignition device to raise the temperature of exhaust gas supplied to the filter 13 and thus to raise the temperature of the filter 13. In this case, the fuel ignition device may be a glow plug or an ignition device. The heater 14 may be replaced with a microwave generator, which irradiates the filter 13 with a microwave to raise the temperature of the filter 13. Furthermore, an electric heating filter may be used as the filter 13. The temperature of the filter 13 may be raised by applying electric current to the filter 13. Furthermore, in the case of the second vehicle where the fuel is added from the fuel addition valve and is ignited by the fuel ignition device to raise the temperature of the exhaust gas supplied to the filter 13, fuel injection timing of the internal combustion engine 11 may be delayed, or post injection may be executed instead of supplying the fuel from the addition valve or in addition to supplying the fuel from the addition valve.

In the first vehicle, the eleventh vehicle, and the second vehicle, when all the determination conditions from S301 to S305 of FIG. 4 are satisfied, it is determined that the user is away from the vehicle 1. Similarly, in the second vehicle, when all the determination conditions from S401 to S405 of FIG. 5 are satisfied, it is also determined that the user is away from the vehicle. However, even when not all the determination conditions from S301 to S305 of the FIG. 4 are satisfied in the first vehicle and even when not all the determination conditions from S401 to S405 of the FIG. 5 are satisfied in the second vehicle, it may be determined that the user is away from the vehicle 1. For example, it may be determined that the user is away from the vehicle 1 when the CPU of the vehicle 1 determines "YES" in step S301 (S401) of "determining whether the seat pressure SP output from the seat pressure sensor 32 is smaller than the first seat pressure $SP_1$," and in step S302 (S402) of "determining whether the door of the vehicle 1 is locked." It may also be determined that the user is away from the vehicle 1 when the CPU of the vehicle 1 determines "YES" in the step S301 (S401) of "determining whether the seat pressure SP output from the seat pressure sensor 32 is smaller than the first seat pressure $SP_1$," and in step S304 (S404) of "determining whether a moving object is absent in the vicinity of the vehicle 1." Furthermore, it may be determined that the user is away from the vehicle 1 when the CPU of the vehicle 1 determines "YES" in step S303 (S403) of "determining whether a response from the smart key is absent." It may be determined that the user is away from the vehicle 1 when the CPU of the vehicle 1 determines "YES" in step S305 (S405) of "determining whether the user is away from the vehicle by at least a specified distance."

When the CPU determines "NO" in S301, S302, S304 in the first vehicle or the eleventh vehicle, or in S401, S402, S404 in the second vehicle, and therefore the user is determined to be in the vehicle or in the vicinity of the vehicle, the CPU may execute processing of at least one of S303 and S305 in the first vehicle or the eleventh vehicle, or may execute processing of at least one of S403 and S405 in the second vehicle. When the CPU determines "YES" in the processing of at least one of S303 and S305, or in the processing of at least one of S403 and S405, the user may be determined to be away from the vehicle 1. Therefore, the CPU may proceed to the processing of S306 in the first vehicle or the eleventh vehicle, or to the processing of S406 in the second vehicle.

In S301 (S401), when a baggage or the like is placed on the driver seat, the CPU determines that the seat pressure SP is equal to or above the first seat pressure $SP_1$ and therefore determines that the user is in the vehicle 1, even though the user is away from the vehicle 1. In S302 (S402), when the user is away from the vehicle 1 without locking the door of the vehicle 1, the CPU determines that the door is not locked and therefore the user is in the vicinity of the vehicle 1. In S304 (S404), when an object other than the user moves in the vicinity of the vehicle 1, the CPU determines that there is a moving object in the vicinity of the vehicle 1 and therefore determines that the user is in the vicinity of the vehicle 1, even though the user is away from the vehicle 1. On the other hand, steps S303 (S403) and S305 (S405) directly detect whether the user is away from the vehicle 1. Accordingly, when the CPU determines "YES" in at least one of S303 (S403) and S305 (S405), it can be determined that the user is away from the vehicle 1, even though the CPU determines "NO" in S301 (S401), S302 (S402), and S304 (S404).

Furthermore, in the vehicle 1, at least one of a determination as to "whether an unillustrated engine hood (bonnet) is closed", a determination as to "whether an unillustrated trunk (boot) is closed", and a determination as to "whether an unillustrated oil filler port is closed" may be added to the determinations for determining whether the user is away from the vehicle 1. When the engine hood is open, it can be determined that there is a high possibility that the user is in the vicinity of the vehicle 1. Accordingly, when the determination as to "whether the engine hood is closed" is added to the determinations for determining whether the user is away from the vehicle 1, it can be determined more reliably that there is a higher possibility that the user is away from the vehicle 1. When the trunk is open, it can be determined that there is a high possibility that the user is placing a baggage in the trunk or taking the baggage from the trunk, and therefore the user is in the vicinity of the vehicle 1. Accordingly, when the determination as to "whether the trunk is closed" is added to the determinations for determining whether the user is away from the vehicle 1, it can be determined more reliably that there is a higher possibility that the user is away from the vehicle 1. Furthermore, when the oil filler port is open, it can be determined more reliably that there is a higher possibility that the user is in the vicinity of the vehicle 1 to supply oil to the vehicle. Accordingly, when the determination as to "whether the oil filler port is closed" is added to the determinations for determining whether the user is away from the vehicle 1, it can be determined more reliably that there is a higher possibility that the user is away from the vehicle 1.

Furthermore, in the first vehicle, the eleventh vehicle, and the second vehicle, the accumulation amount of PM accumulated on the filter 13 is acquired using the differential pressure sensor 24. However, the method for acquiring the accumulation amount of PM accumulated on the filter 13 is not limited thereto. For example, the accumulation amount of PM accumulated on the filter 13 may be acquired based on a time period during which the internal combustion engine 11 is driven after the last execution of the PM removal control or based on a traveling distance of the vehicle 1 after the last execution of the PM removal control. Furthermore, the accumulation amount of PM accumulated on the filter 13 may be acquired by calculating the amount of PM discharged from the internal combustion engine 11 based on the load of the internal combustion engine 11.

What is claimed is:

1. A vehicle comprising:
    a filter disposed in an exhaust passage through which exhaust gas discharged from an internal combustion engine passes, the filter being configured to collect PM that is particulate matter contained in the exhaust gas; and
    an electronic control unit configured to
    start execution of PM removal control that heats the filter to remove the PM accumulated on the filter while the internal combustion engine is stopped; and
    determine whether a user of the vehicle is away from the vehicle such that the user is not in a vicinity of the vehicle where the user feels discomfort due to operation sound caused by the PM removal control, wherein
    the electronic control unit is configured to start the execution of the PM removal control only when it is determined that the user of the vehicle is away from the vehicle.

2. The vehicle according to claim 1, wherein the electronic control unit is configured to determine that the user of the vehicle is away from the vehicle when a seat pressure that is a pressure applied to a seat of the vehicle is smaller than a specified seat pressure and a door of the vehicle is locked.

3. The vehicle according to claim 1, wherein the electronic control unit is configured to determine that the user of the vehicle is away from the vehicle when a seat pressure that is a pressure applied to a seat of the vehicle is smaller than a specified seat pressure, and a state where there is no moving object in vicinity of the vehicle continues for a first time period.

4. The vehicle according to claim 1, wherein the electronic control unit is configured to
    acquire a distance between the vehicle and the user; and
    determine that the user of the vehicle is away from the vehicle when the user of the vehicle is away from the vehicle by at least a specified distance.

5. The vehicle according to claim 1, wherein the electronic control unit is configured to
    receive a signal from a smart key that communicates with the vehicle; and
    determine that the user of the vehicle is away from the vehicle when a state where the electronic control unit receives no signal from the smart key continues for a second time period.

6. The vehicle according to claim 1, wherein the electronic control unit is configured to determine that the user of the vehicle is away from the vehicle when at least i) a first condition that a seat pressure that is a pressure applied to a seat of the vehicle is smaller than a specified seat pressure, and ii) a second condition that a door of the vehicle is locked are satisfied.

7. The vehicle according to claim 1, wherein the electronic control unit is configured to determine that the user of the vehicle is away from the vehicle when at least i) a first condition that a seat pressure that is a pressure applied to a seat of the vehicle is smaller than a specified seat pressure, and ii) a third condition that a state where there is no moving object in vicinity of the vehicle continues for a first time period are satisfied.

8. The vehicle according to claim 7, wherein the electronic control unit is configured to
    acquire a distance between the vehicle and the user; and
    determine that the user of the vehicle is away from the vehicle when at least a fourth condition is satisfied, the fourth condition being a condition that the user of the vehicle is away from the vehicle by at least a specified distance.

9. The vehicle according to claim 1, wherein the electronic control unit is configured to
    receive a signal from a smart key that communicates with the vehicle; and determine that the user of the vehicle is away from the vehicle when at least a fifth condition is satisfied, the fifth condition being a condition that a state where the electronic control unit receives no signal from the smart key continues for a second time period.

10. The vehicle according to claim 1, wherein the electronic control unit is configured to acquire a distance between the vehicle and the user;

receive a signal from a smart key that communicates with the vehicle; and determine that the user of the vehicle is away from the vehicle when a first condition, a second condition, a third condition, a fourth condition, and a fifth condition are satisfied, the first condition being a condition that a seat pressure that is a pressure applied to a seat of the vehicle is smaller than a specified seat pressure, the second condition being a condition that a door of the vehicle is locked, the third condition being a condition that a state where there is no moving object in vicinity of the vehicle continues for a first time period, the fourth condition being a condition that the user of the vehicle is away from the vehicle by at least a specified distance, and the fifth condition being a condition that a state where the electronic control unit receives no signal from the smart key continues for a second time period.

11. The vehicle according to claim 1, wherein the electronic control unit is configured to acquire an accumulation amount of the PM accumulated on the filter; and start execution of the PM removal control when it is determined that the user of the vehicle is away from the vehicle, and the accumulation amount is larger than a first accumulation amount.

* * * * *